Nov. 13, 1928.
G. B. BEAMAN
1,691,178
INSULATING SHIPPING CONTAINER
Filed Feb. 20, 1925  2 Sheets-Sheet 1
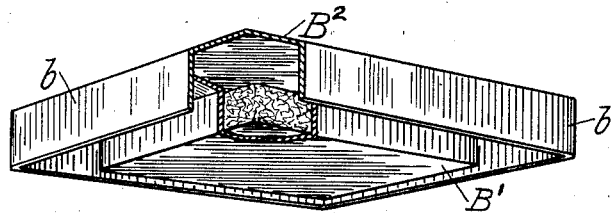
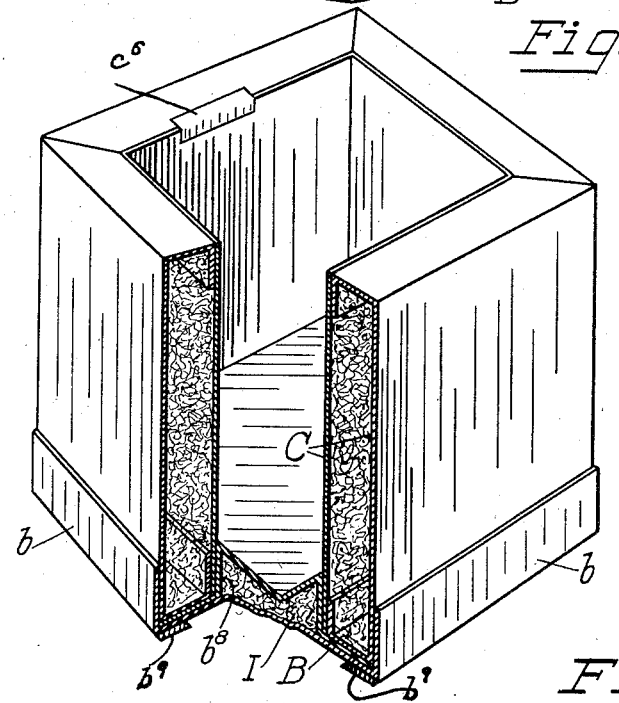
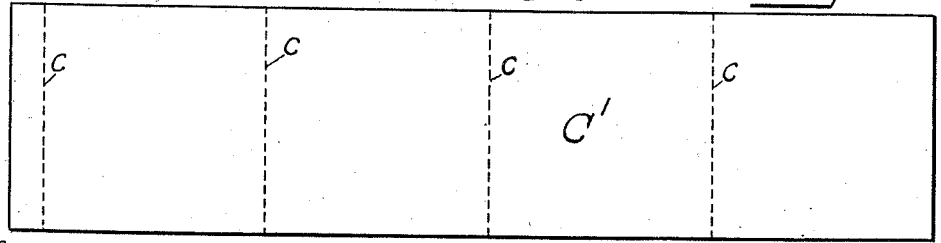
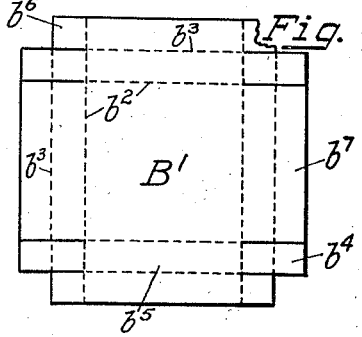
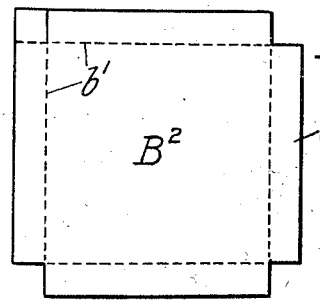
INVENTOR
George B. Beaman
BY
Walter A. Knight
ATTORNEY Nov. 13, 1928.  G. B. BEAMAN  1,691,178
INSULATING SHIPPING CONTAINER
Filed Feb. 20, 1925    2 Sheets-Sheet 2
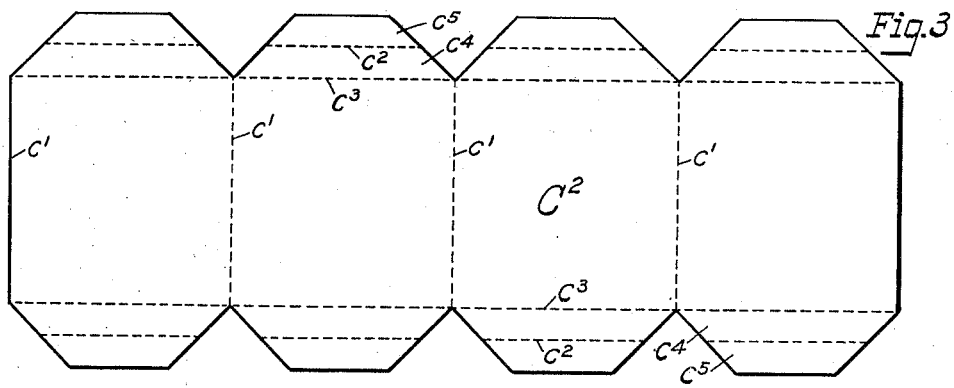
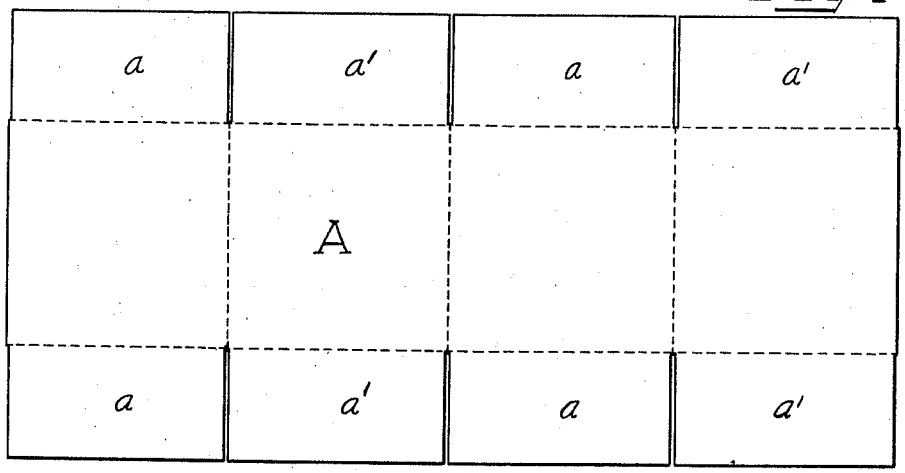
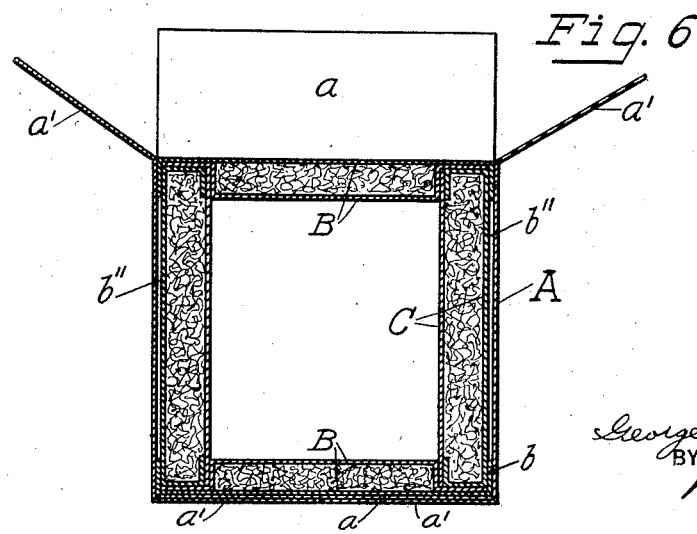
INVENTOR
George B. Beaman
BY
Walter A. Knight
ATTORNEY Patented Nov. 13, 1928.

1,691,178

UNITED STATES PATENT OFFICE.

GEORGE B. BEAMAN, OF FORT WAYNE, INDIANA, ASSIGNOR TO FORT WAYNE CORRUGATED PAPER COMPANY, OF FORT WAYNE, INDIANA, A CORPORATION OF INDIANA.

INSULATING SHIPPING CONTAINER.

Application filed February 20, 1925. Serial No. 10,592.

My invention relates to insulating shipping containers, in which food or other articles are packed for shipment and kept for a comparatively long time in substantially the same condition and at a temperature safely approximately that at which it was when placed in the container, as while being transported to distant places.

In such containers fish, fowls, meats and other articles which must be kept cold to prevent decay may be shipped long distances in hot weather; fruit, eggs and other articles that would be ruined by freezing may be safely shipped in extremely cold weather, and such articles as celery which must be kept moist may be transported without drying out in transit.

The difficulty and high cost of icing enroute frozen goods, and preventing goods like fruit from becoming frozen on the way are appreciated by those familiar with the handling and transportation of such articles. Refrigerator and fruit cars make it possible generally to handle large shipments but not small ones.

With my improved container small shipments may be made and the consignee assured of the arrival of the package contents in perfect condition. Thus homes and hotels in the interior may receive by parcel post or express sea or lake foods fresh and sanitary; while those in large cities may receive poultry or the like fresh from the producers' packing house hundreds of miles away.

The deterioration of many foods in cold storage and the danger of ptomaine poisoning are facts well known. Freshly caught fish and freshly killed poultry are therefore, as well as because more delectable food, greatly preferred by discriminating people.

One object of my invention is to provide such an insulating container with its units so pre-filled with insulating material and sealed, that the insulating material will not be spilled into the space reserved to receive the goods shipped, hence if food products are shipped they will be kept sanitary, inviting and wholesome.

Another object of my invention is to form the insulating walls in units, which will be separately assembled and filled with insulating material in advance and these pre-filled units may then be quickly placed in the outer casing whenever the perishable goods are to be packed for shipment. The contents may be removed from such a container without packing material spilled onto them.

Another object of my invention is to form of the pre-filled units a complete container for the goods to be shipped, seal the container when so packed and assembled so as to make an air tight enclosure, and then place this sealed container in the outer shipping case. This shipping case may preferably also be sealed or the outer case only sealed. Contacting surfaces may be cemented together with silicate or other cementing agent and all joints may be sealed with tape in addition. The inside of the container may be lined with waxed parchment or otherwise made impervious as by coating with silicate, to further insulate and protect such articles as must be handled with great care.

Another object of my invention is to provide container sufficiently strong to enable such goods to be safely transported therein by parcel post or express, and yet cheap enough to make it practical to throw the container away. When carefully unsealed and unpacked the container may be re-used.

Another object of my invention is to provide a dead air space between the insulated walls of the food container and the outside protecting casing, excepting at the edges. These spaces also add to the resiliency of the casing making it more unlikely to be broken through in shipping. However, the dead air space feature of my invention may be entirely omitted and still have a very effective insulating shipping container.

Any or all of the elements constituting this structure may be made of double-faced single wall corrugated board, or of double or triple wall corrugated board, it being understood that corrugated board forms a resilient as well as a strong case; or they may be made of chip-board, fibre board or other suitable material.

In the particular embodiment of my invention selected for illustration:

Figure 1 is a perspective of the pre-assembled bottom unit, in which has been placed the pre-assembled unit forming the four sides, and above this second unit is spaced the pre-assembled top unit ready to be placed down in position; with parts cut and broken away and in section to show the method of forming the units and the insulating material therein;

Fig. 2 is the creased sheet from which the inner member of the four-wall unit is formed;

Fig. 3 is the creased and mitered sheet from which the outer walls, top and bottom edges of the four-wall unit is formed;

Fig. 4 is one form of the creased and slotted sheet from which the inner portion of a top or bottom unit is formed;

Fig. 5 is the creased and corner notched sheet from which the outer portion of a top or bottom unit is formed;

Fig. 6 is a vertical section through the outer casing and the bottom unit, four-wall unit, and top unit assembled therein, ready to fold down the casing flaps and seal the package for shipment; and Fig. 7 is the creased and slotted sheet from which the casing is formed.

Referring now to the drawings, the complete container is composed of the elements A, B, of which there are two, and C. A designates the outer casing made of a creased and slotted corrugated paper sheet and usually sent from the box factory knocked down and pasted together to form a four-sided tube, shipped flat. It has top and bottom inner flaps $a$, formed by slotting the extensions at the corners and scoring the material at the top and bottom edges of the opposite sides and when folded over their outer edges may abut. It has also similar top and bottom out flaps $a^1$, similarly formed on the remaining opposite sides. Either end of the tube A may be used as the bottom or top. Flaps $a$ and then $a^1$ are folded in and fastened in position to form the bottom in any usual manner, as pasting, gluing, silicating, wire stitching, riveting, or sealing with binding strips, or preferably sealing with binding strips in addition to silicating.

The bottoms and tops B are alike and interchangeable. Each is formed of two pieces. The outer piece $B^2$ has edges $b$ formed by single scoring as shown by the dotted lines $b^1$ and its corners cut out as shown in Fig. 5. When properly folded and each of the corners secured by tape to the adjacent portion of the flanges $b$, which are then at right angles to the body portion, a rigid cupped member is formed. Instead of cutting out the corners they may be slotted and scored, as shown at the upper left corner of Fig. 5, and this corner piece bent over and cemented to the adjacent end of the contiguous edge.

The inner piece $B^1$ has its edges double scored as shown by dotted lines $b^2$, $b^3$, and its corners cut as shown by full lines in Fig. 4, forming ends $b^4$, on the ends of two opposite inner flanges, which form the vertical edges $b^5$, while ends $b^6$ are formed on the contiguous strips $b^7$ and all four of these flanges $b^7$ form the supporting foot flange.

When properly folded the strips $b^5$ are at right angles to the body portion, the ends $b^4$ are tucked in lying along the adjacent portion of the strips $b^5$ and the strips $b^7$ are parallel with the body portion. The receptacle is formed by combining the pieces $B^1$ and $B^2$ preferably by cementing them together, after the space indicated by $b^8$ in Fig. 1 has been filled with naturally or artificially shredded or comminuted non-conducting or insulating material I of any suitable kind, forming a complete bottom or top. All insecure joints are preferably taped. To provide for a dead air space like the one $b^{11}$ next the side formed by a top or bottom head, strips $b^9$ of corrugated board are cemented to the outside of the piece $B^2$ at its edges, leaving the dead air spaces $b^9$ between all but the edges of the completed inner casing and the inside of the casing A, when placed therein. Fig. 6 does not show the air spaces formed by $b^9$, but the construction will be readily understood from Fig. 1.

The 4-wall section C is composed of two pieces. The inner piece $C^1$ is vertically scored as shown in Fig. 2 by dotted lines $c$, and folded and cemented, forming a plain four-walled tube.

The outer piece $C^2$ shown in Fig. 3, is vertically scored as shown in Fig. 3 by dotted lines $c^1$, and folded and taped or otherwise secured, forming a 4-walled tube. It is also scored at each end of these walls by lines $c^2$ and $c^3$. When bent at these score lines $c^3$ the strips $c^4$ form edges at the top and bottom of this tube, and the strips $c^5$ are folded inwardly at the score lines $c^2$ parallel with the walls of this tube, and are adapted to rest against ends of the walls of the line formed by the piece $C^1$ and preferably inside thereof. These strips $c^5$ are now cemented to the walls of the tube formed of the piece $C^1$ at one end thereof.

The space between the walls of the tube formed by pieces $C^1$ and $C^2$ is then filled with said insulating material. The open end of the tubes is then joined in the same manner as the end which was closed first. All insecure joints are preferably taped as shown at $C^6$.

The 4-wall section C is then fitted to one of the end sections B and is preferably secured thereto as by cementing and taping. The food container when properly cooled is now ready for packing. When filled another section B is used to close the open end and is preferably cemented and taped in place making an air tight closure. The container may be used without an outside protecting case but I prefer to enclose it in out casing A. It will be observed that a dead air space $b^{11}$ is between the main portion of each side wall and the contiguous side of the container. Such dead air spaces can be omitted, the size of the container reduced, and the cost of the container reduced by omitting the strips $b^9$ and the flange strips or edges $b$. The heads B will then be secured to the 4-wall container C by cementing contiguous surfaces together.

The insulating container so packed is then ready to be placed in the casing A, one end of which has been previously cemented and taped. The open end of the casing is then closed and preferably closed and taped; and the package is ready for shipment.

Obviously many changes may be made in this container without departing from the spirit of this invention; and I claim all forms that are within the scope of the claims that shall finally be allowed herein.

I claim as my invention and desire to secure by Letters Patent of the United States:

1. For use in constructing an insulating shipping container, made up of a plurality of separately assembled sections comprising an inside tubular element and a head for each end thereof, and an outer casing, a creased blank and a creased and slotted blank from which the main walls of the inside tubular element of said container are formed, two creased and slotted blanks from which the walls of each head are formed, said head having a channel within which an end of the inside tubular element seats and a creased and slotted blank to form an outer casing for said tubular member and heads when assembled.

2. For use in constructing an insulating shipping container made up of three separate sections namely: a tubular section and two heads, one to close either end of said tubular section; a creased blank to form the inner walls of a tubular section which forms four walls of the box; a creased and slotted blank to form the outer walls, edges and connection flaps of said tubular section; and for each of the heads a creased and slotted blank from which the inner wall is formed including a raised portion thereof adapted to telescope snugly inside said tubular section at one of its ends and a creased and slotted blank from which the outer wall of said head is formed including an inwardly depending flange adapted to fit snugly over the outer walls of said tubular section.

In testimony whereof, I have hereunto set my hand this 28th day of February, 1925.

GEORGE B. BEAMAN.